United States Patent [19]

Sekiya et al.

[11] Patent Number: 4,566,127
[45] Date of Patent: Jan. 21, 1986

[54] COMPLEX SYSTEM HAVING THE FUNCTIONS OF OPTICAL CHARACTER READER AND FACSIMILE

[75] Inventors: Kunihiko Sekiya, Yokohama; Kunio Sakai, Urayasu; Shoichi Hirai, Yokohama; Shigeru Miyao; Masatoshi Fukuda, both of Tokyo, all of Japan

[73] Assignee: Tokyo Shibaura Denki Kabushiki Kaisha, Kawasaki, Japan

[21] Appl. No.: 413,161

[22] Filed: Aug. 30, 1982

[30] Foreign Application Priority Data

Oct. 9, 1981 [JP] Japan .................................. 56-160268

[51] Int. Cl.$^4$ ........................... G06K 9/00; G06F 3/14
[52] U.S. Cl. ..................................... 382/56; 340/734; 358/263; 382/57; 382/61
[58] Field of Search ............................. 382/56, 57, 61; 358/263; 340/734

[56] References Cited

U.S. PATENT DOCUMENTS

| | | | |
|---|---|---|---|
| 3,792,462 | 2/1974 | Casey et al. | 340/734 |
| 3,925,760 | 12/1975 | Mason et al. | 382/57 |
| 4,180,798 | 12/1979 | Komori et al. | 382/14 |
| 4,414,579 | 11/1983 | Dattilo et al. | 358/286 |

OTHER PUBLICATIONS

Model OCR/FAX, Dest Data Corporation.

*Primary Examiner*—Leo H. Boudreau
*Attorney, Agent, or Firm*—Oblon, Fisher, Spivak, McClelland & Maier

[57] ABSTRACT

A complex system in which the functions of OCR (optical character reader) and facsimile are combined by a CPU (central processor unit). The complex system operates in an OCR-facsimile mode to effect a complex processing of character information and image information as well as a usual OCR mode to effect coding of character information and a usual facsimile mode to effect a communication of character/image information.

1 Claim, 10 Drawing Figures

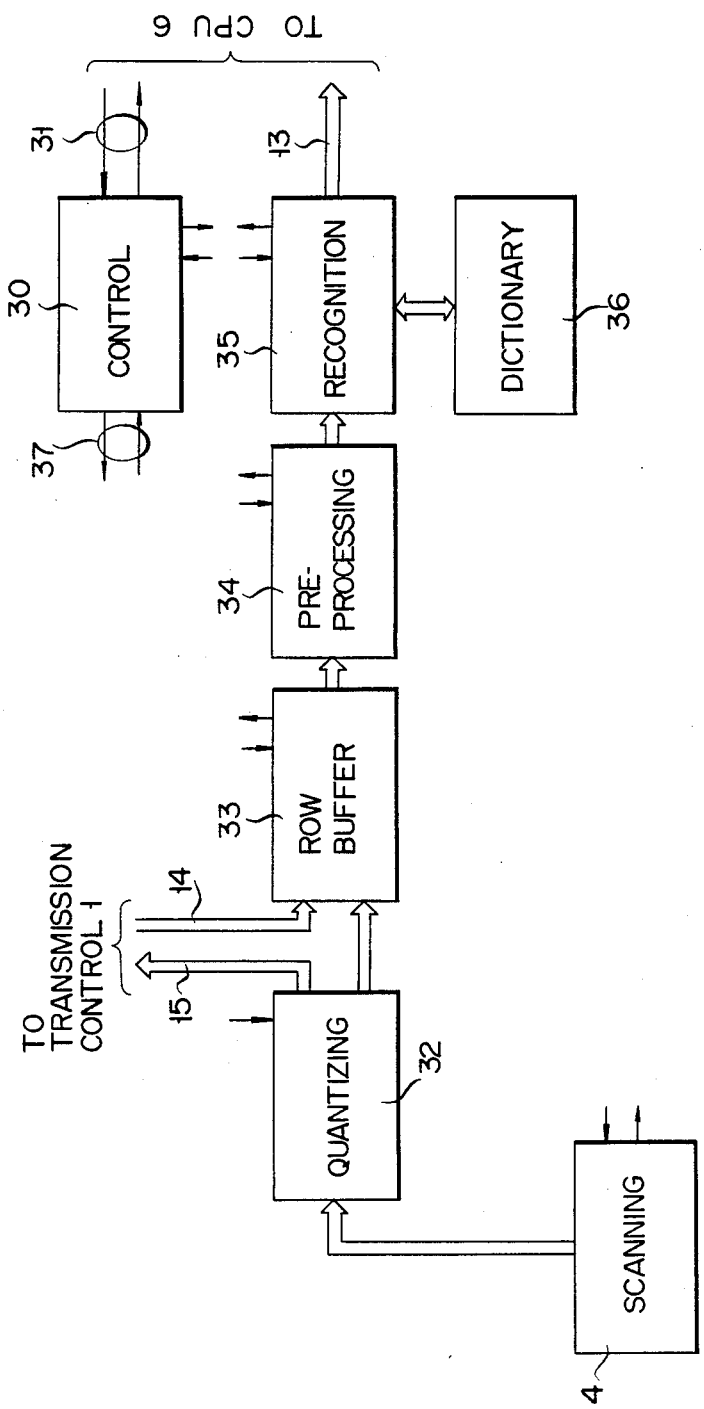

FIG. 10
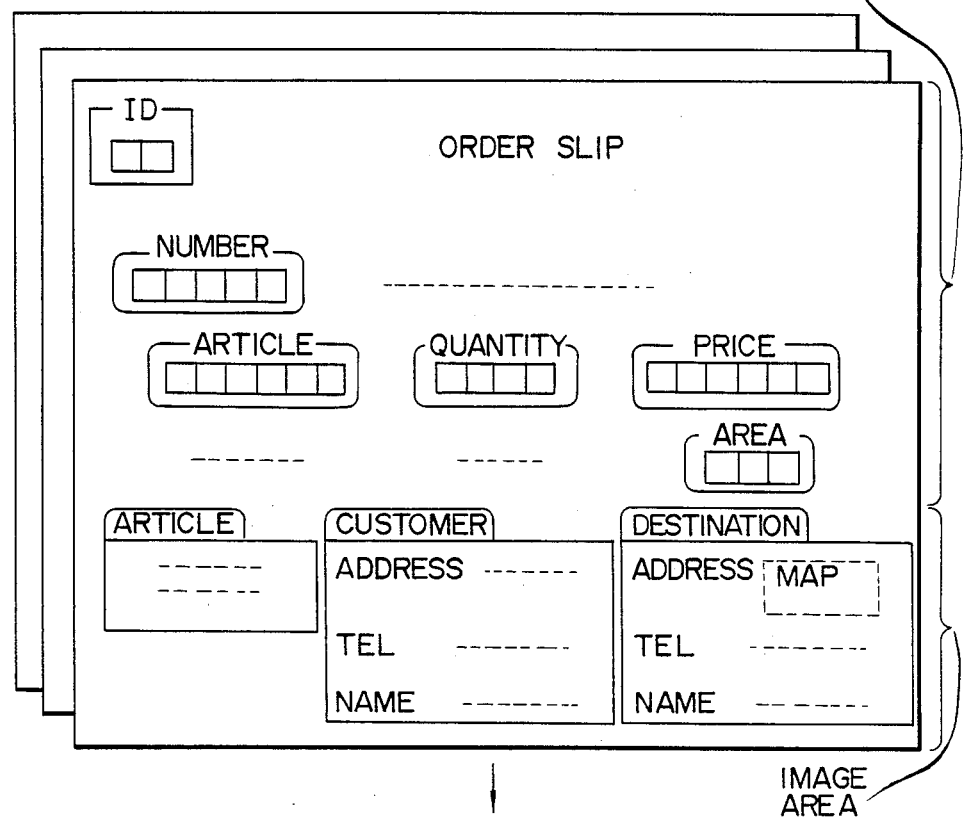
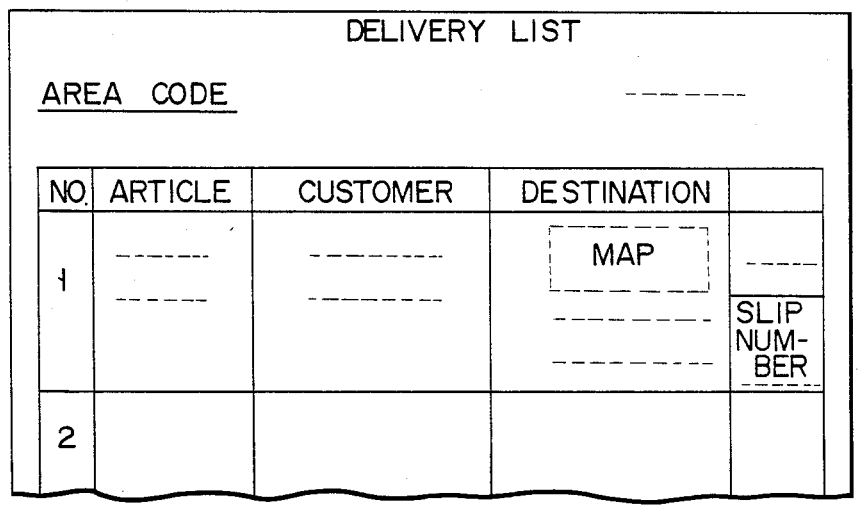

COMPLEX SYSTEM HAVING THE FUNCTIONS OF OPTICAL CHARACTER READER AND FACSIMILE

BACKGROUND OF THE INVENTION

The present invention relates to a complex system having optical character reader (OCR) and facsimile functions.

As OCR and facsimile become popular, systems with combined OCR and facsimile functions are desired. These systems can be grouped into those intended to read characters on facsimile receiving papers by means of OCR and those intended to receive electric signals through facsimile and to recognize these signals by means of OCR without copying them. With former it is difficult to maintain recognition accuracy because sheets of paper are used as intermediate media. The latter recognize received character images as electric signals but have not been improved to combine the processings of characters and images.

SUMMARY OF THE INVENTION

The object of the present invention is to provide a complex system wherein the functions of OCR (optical character reader) and facsimile are combined through a CPU (central processor unit) to provide multiple functions.

A complex system according to the present invention comprises scanning means for optically scanning a manuscript to produce electric signals representing a scanned pattern; communication control means for communicating character and image information on manuscripts with an external equipment through facsimile communication lines; character recognition means connected to receive character and image information from the scanning and communication control means for recognizing characters at a predetermined character area on the manuscript to produce character codes; character and image file means for storing character and image information obtained from the scanning and communication control means and character codes obtained from the character recognition means; recording means for printing out character and image information applied from the communication control means and character and image file means; input means for specifying a process mode of the system; and control means for editing image information at a predetermined image area on a manuscript having a predetermined format stored in the character and image file means and controlling each of said means of the system to achieve the process mode specified by the input means.

BRIEF DESCRIPTION OF THE DRAWINGS

FIG. 3 is a block diagram showing the character recognition section shown in FIG. 1.

FIG. 10 shows an example of a combined process of character and image information achieved by the complex system according to the present invention.

DETAILED DESCRIPTION OF THE PREFERRED EMBODIMENT

Figure 1:
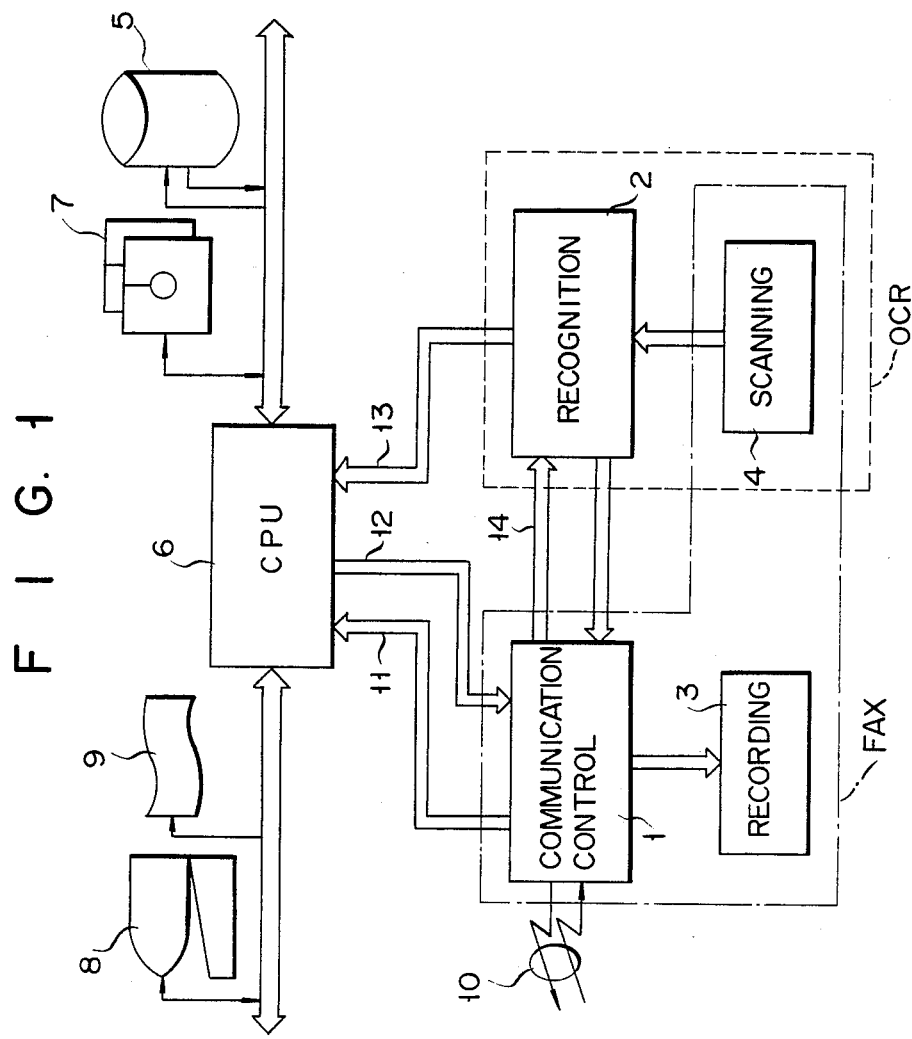
FIG. 1 is a block diagram showing a complex system according to the present invention.

As shown in FIG. 1, the complex system according to the present invention has a main arrangement comprising a communication control section 1, a character recognition section 2, a recording section 3, a scanning section 4, a character/image file 5 and a central processor unit (CPU) 6 serving as a system controller. Communication control section 1, recording section 3 and scanning section 4 serve to achieve the facsimile function, while recognition section 2 and scanning section 4 serve to achieve the OCR function.

The system shown in FIG. 1 has the operation modes of OCR, facsimile and OCR/facsimile. The system is used as a standard OCR in the OCR mode (coding character information) and as a standard facsimile in the facsimile mode (communicating image information). In the OCR/facsimile mode (complex process of character/image information), the system is used to combine a plurality of fundamental functions so as to achieve a variety of complex processes such as received image recognition, image edition, storage, transmission and reception of character/image file, and transmission of character codes.

Communication control section 1 transmits and receives image information including character codes to and from an external equipment through a communication line 10. Image information received by communication control section 1 is applied through a data line 11 to CPU 6, or through a data line 14 to recognition section 2, or to recording section 3 to be printed out.

Recognition section 2 receives image information from scanning section 4 or communication control section 1 to recognize character information at a character area on an input manuscript. Character codes of the characters recognized are applied through a data line 13 to CPU 6.

Character/image file 5 serves to store image information and character codes applied from communication control section 1 or recognition section 2 through CPU 6. A magnetic disc memory may be used for file 5.

Recording section 3 is an output unit which serves to record, as hard copies, character/image information received through communication line 10 or character/image information read out from character/image file 5 by means of CPU 6.

Scanning section 4 is an input unit for optically scanning various kinds of documents to obtain image information as electric signals.

CPU 6 is a minicomputer (such as TOSBAC 40) programmed to control the operation of each of said sections and to edit information stored in character/image file 5.

The editing process is to convert an input manuscript of a certain format to an output manuscript of another format. It includes the process of issuing sales slips, bills and the like from an order list for each orderer. It also includes the process of forming a delivery list from a plurality of delivery slips.

To CPU 6 are connected a floppy disc 7 which stores control program and the like for controlling CPU 6, a keyboard-attached display 8 which achieves menu selection to specify process modes described-later and displays unrecognizable reject-characters to be key-corrected, and a serial printer 9 for printing out, as slips, the operation and process results of CPU 6, such as a total amount obtained by multiplying a unit price by the number of articles.

Figure 2:
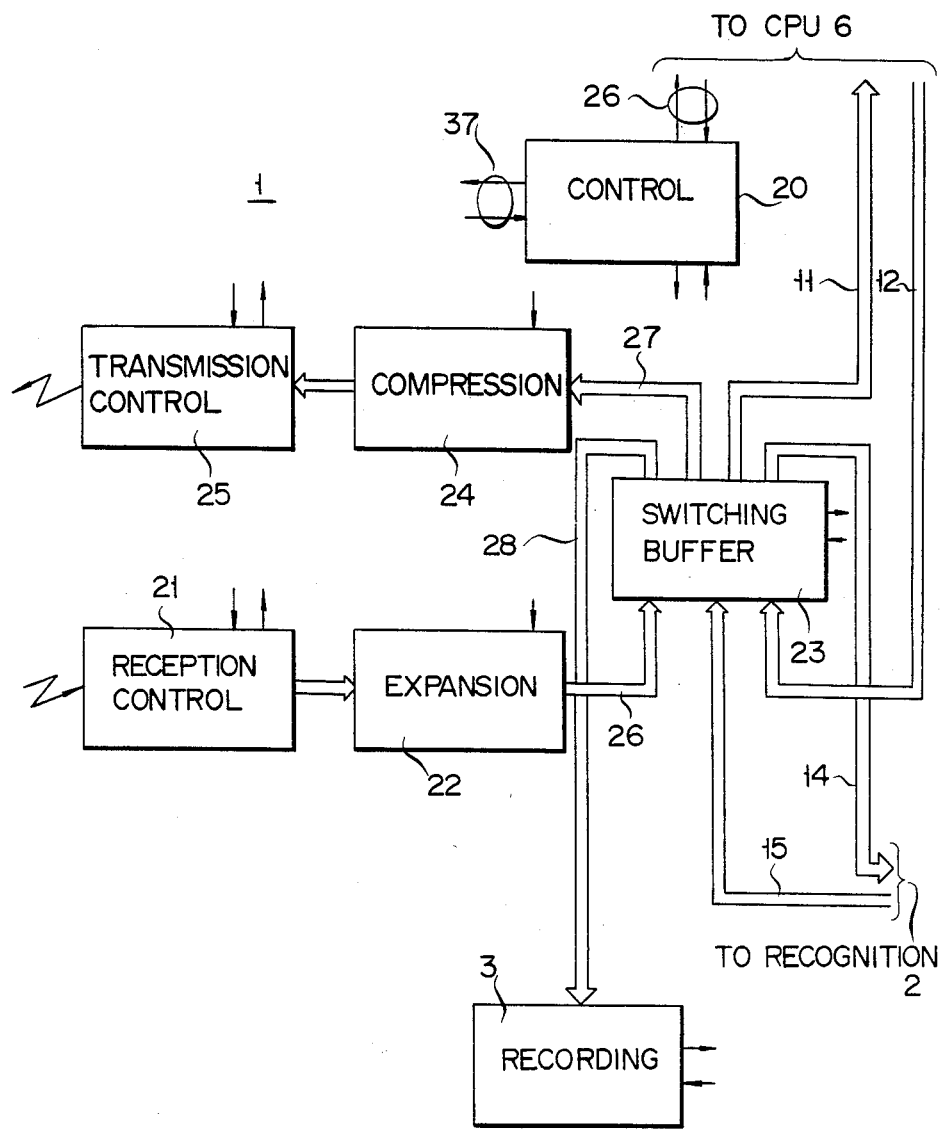
FIG. 2 is a block diagram showing the communication control section shown in FIG. 1.

FIG. 2 shows an arrangement of communication control section 1. Numeral 20 represents a control circuit for controlling communication control section 1, for which a micro computer such as Intel 8085 can be used. Control circuit 20 is connected to CPU 6 via a control line 26, instructs the operation of each circuit according to the command from CPU 6, and informs the CPU 6 of every state of the communication control section 1 when requested by CPU 6.

A reception control circuit 21 functions to receive data and to thus detect reception requests applied from external equipments through communication line 10. Reception data (compression code) received by reception control circuit 21 is decoded by an expansion circuit 22 and then stored in a switching buffer 23 through a data line 26. Switching buffer 23 comprises two sets of buffers each receiving image information assigned to plural lines. A data line 12 from CPU 6 and data line 15 extending from recognition section 2 are connected to switching buffer 23 in addition to data line 26. One of data lines 12, 15 and 26 is selectively connected to switching buffer 23 according to a command from control circuit 20. Similarly, any one of data lines 11, 14, 27 and 28 is selected as an output of switching buffer 23 according to a command of control circuit 20.

When image information to be transmitted to an external equipment is supplied from CPU 6 through data line 12 or from recognition section 2 through data line 15, data line 27 is selected to supply the image information to a compression circuit 24. The image information is converted by compression circuit 24 to a compressed code according to a predetermined coding system and then transmitted through a transmission control circuit 25 to communication line 10. Recording section 3 is also controlled by control circuit 20.

FIG. 3 shows an arrangement of character recognition section 2. Numeral 30 denotes a control circuit for controlling recognition section 2, for which a microcomputer such as Intel 8085 can be employed. Control circuit 30 is connected to CPU 6 through a control line 31, instructs the operation of each circuit according to a command of CPU 6, and informs the CPU 6 of every state of the recognition section when requested by CPU 6.

A quantizing circuit 32 converts an analog signal, which is obtained when scanning section 4 scans an input manuscript, to a binary signal and supplies it to communication control section 1 or a row buffer 33 through data line 15 according to a command of control circuit 30. Row buffer 33 can accommodate image information corresponding to characters on a row on the input manuscript. The contents of row buffer 33 are detected and cut out by a pre-processing circuit 34 for each image information area corresponding to a character, subjected to pre-processes such as noise removal and normalization, and supplied to a recognition circuit 35. Recognition circuit 35 calculates the similarity between a standard character pattern in a dictionary 36, which memorizes standard character pattern data, and an input pattern included in an image information area for one character, to achieve character recognition and conversion into a character code. The character code is applied to CPU 6 through data line 13. The apparatus and method disclosed in U.S. Pat. No. 3,688,267 can be employed to achieve the character recognition.

Control circuit 30 also controls scanning section 4 and supplies an end detection signal of an input manuscript and a line synchronizing signal, which represents the end of a line to control circuit 20 in communication control section 1 as well as an image clock signal to switching buffer 23 through control line 37 so as to establish synchronization between the scanning operation and the transmitting operation. In addition, control circuit 30 receives from control circuit 20 a step request signal requesting an image signal of the next line.

Figure 4:
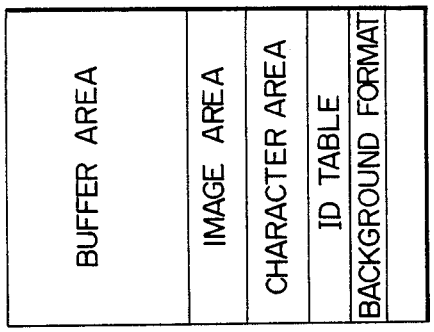
FIG. 4 shows the arrangement of a memory region of the character and image file shown in FIG. 1.

FIG. 4 shows an arrangement of memory areas of character/image file 5. A buffer area temporarily stores image information obtained in scanning section 4 or image information received by communication control section 1 through communication line 10. The buffer area stores, for example, several files of character/image information, each file corresponding to an A4-sized sheet of manuscript. The character/image information including a character area and an image area of slips and stored in the buffer area are divided to image and character information for the editing process. The image and character information are stored in image and character code memory areas, respectively. Other areas store format numbers (IDs) representing formats of slips to be processed, ID tables representing character positions (or coordinates) in the character area on the slips, and background format information relating to predetermined characters and rules necessary to an output manuscript such as a list of a predetermined format to be printed out by recording section 3.

The operation of the above-described embodiment will be described referring to flow charts.

Figure 5:
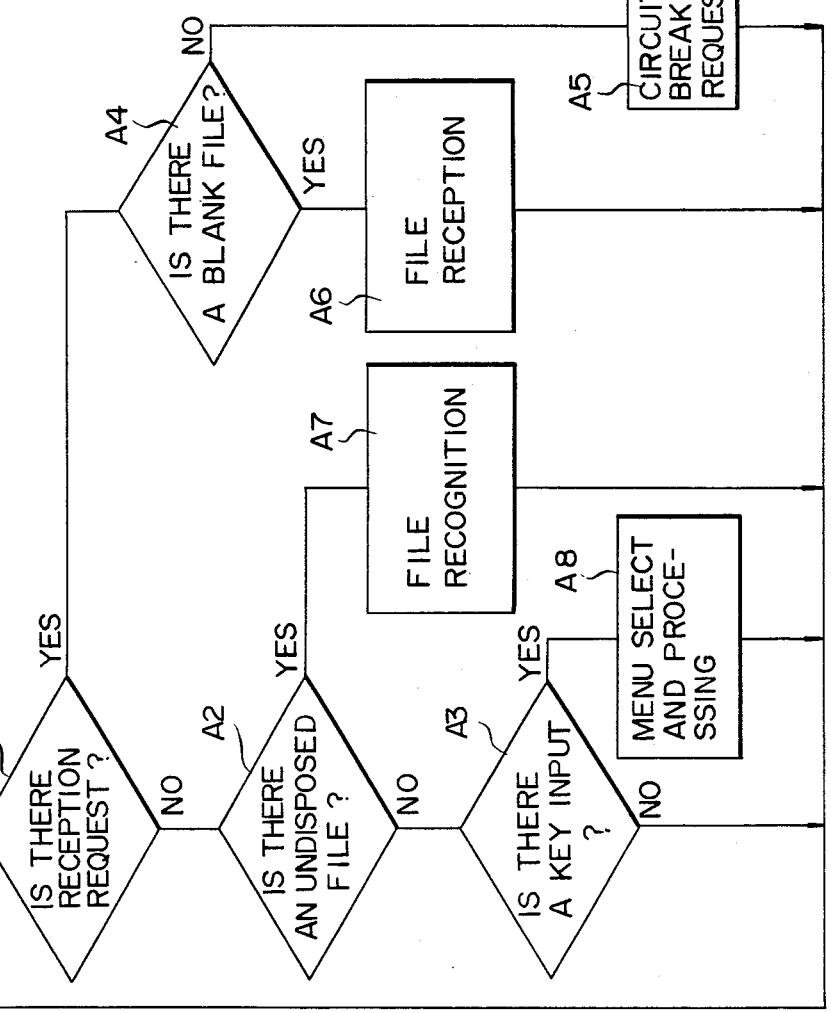
FIGS. 5 through 9 are flow charts showing the operation of the complex system according to the present invention.

FIG. 5 shows an overall flow chart of the above-described system. When a power supply of the system is switched on, CPU 6 monitors whether an operation starting command is issued by means of steps A1, A2 and A3.

Figure 6:
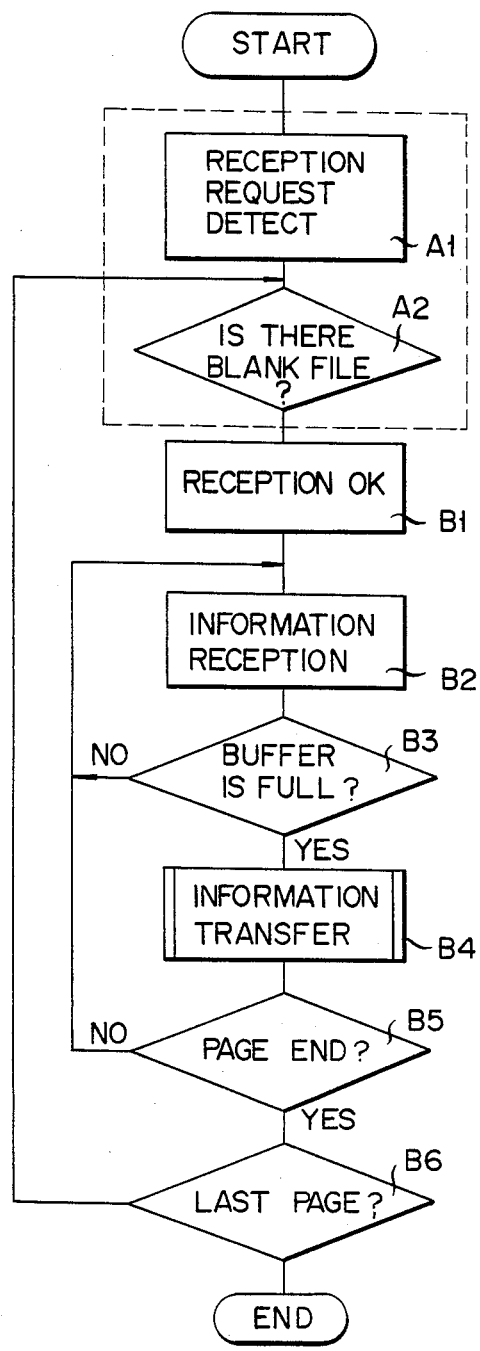

In step A1, CPU 6 interrogates control circuit 20 in communication control section 1 whether or not reception is requested by any of external devices through communication line 10. If reception control circuit 21 detects the request of reception, control circuit 20 informs CPU 6 of the presence of a reception request. As a result, in step A4, CPU 6 interrogates character/image file 5 whether or not a space for temporarily storing information is present in its buffer area. If it is informed that no space is present in the buffer area, the operation proceeds to a step A5. In step A5, CPU 6 issues the line break request to control circuit 20, which then breaks the line. The operation returns to step A1 again to detect whether or not other reception requests are present. When it is answered by character/image file 5 in step A4 that space is present in its buffer area, the operation advances to a step A6 and a file reception process is attained as shown in FIG. 6.

Figure 7:
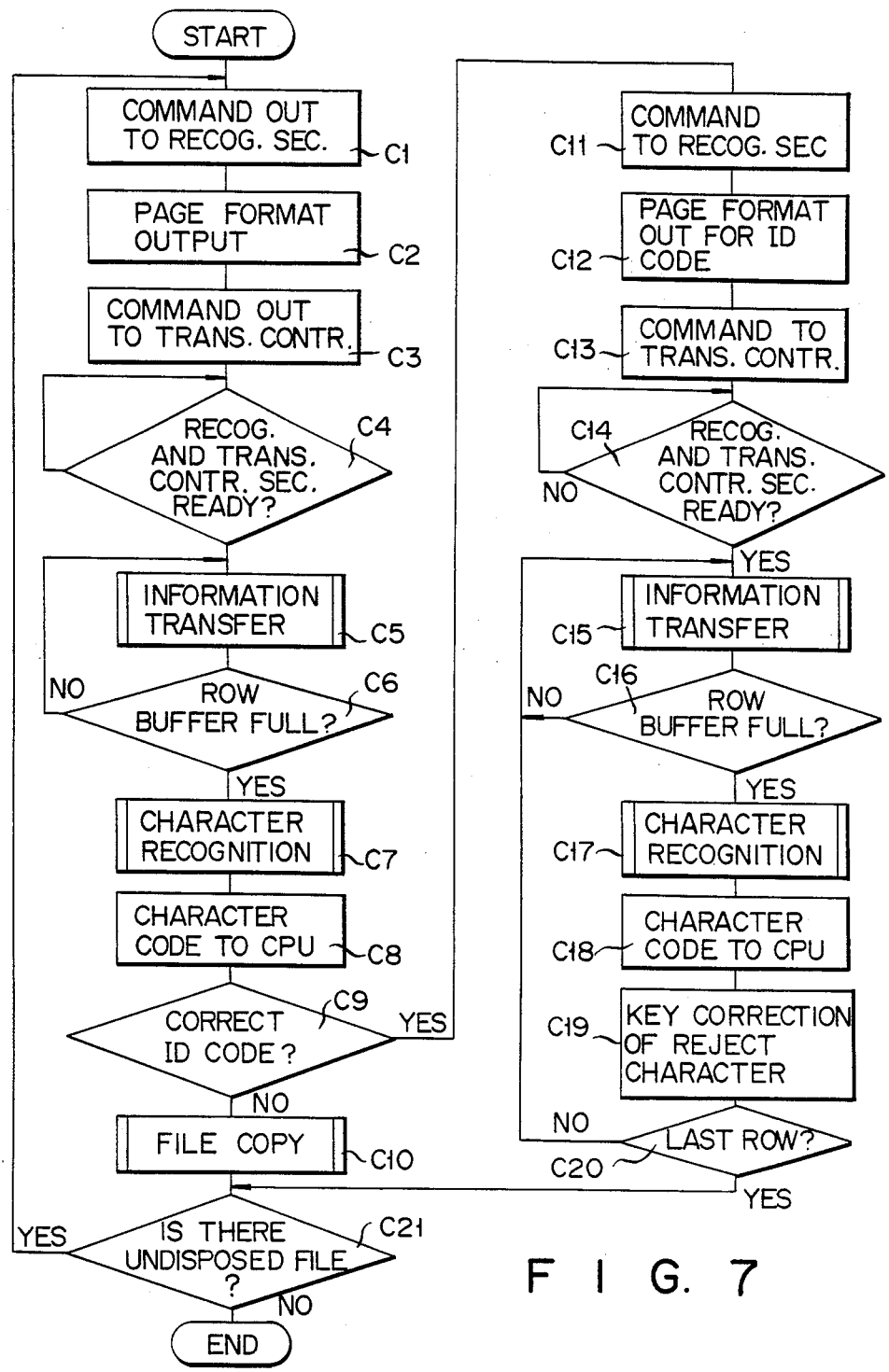

In step A1, when control circuit 20 informs that no request of reception is present, the operation proceeds to step A2. In step A2, CPU 6 interrogates character/image file 5 whether or not any undisposed file is present in the buffer area. If it is answered that some undisposed files are still present, file recognition process shown in FIG. 7 is carried out in a step A7. When it is answered from character/image file 5 to CPU 6 in step A2 that no undisposed file is still present, the operation advances to step A3.

In step A3, CPU 6 checks whether or not a key input is applied from keyboard 8, and the operation is shifted to a step A8 when the key input is present. In step A8, selection of various process modes, that is, menu selection and a selected process is carried out. When no key input is present, the operation returns to step A1 again.

File Reception

This is a mode in which manuscripts or slips transmitted from a remote facsimile is stored in the buffer area of character/image file 5. Its flow chart is shown in FIG. 6.

This mode is carried out when the reception request is detected and the file blank is confirmed. CPU 6 applies a response of "reception OK" to control circuit 20 in communication control section 1 in a step B1. As a result, control circuit 20 drives each circuit for reception in communication control section 1. For example, control circuit 20 instructs switching buffer 23 to select data line 26 as its input and data line 11 as its output. Reception control circuit 21 receives, in a step B2, character/image information in the form of compressed code from a remote facsimile, and the compressed code is decoded by expansion circuit 22. Output information of expansion circuit 22 is successively stored in one of buffers in switching buffer 23 through data line 26. When this buffer is fully filled with information, switching buffer 23 informs "buffer FULL" to control circuit 20 in a step B3. Control circuit 20 further informs CPU 6 of this state and the CPU transfers image information of switching buffer 23 to the buffer area of character/image file 5 in a step B4. Steps B2, B3 and B4 are repeated until reception control section 21 detects the end of a page in a step B5. When the end of page is detected, the operation proceeds to a step B6. When reception control section 21 does not detect the last page in step B6, it is again checked whether or not a space is present in the buffer area of file 5. When a space is present in the buffer area, image information of the next page is stored in the buffer area. And when the last page is detected, file reception process is finished.

File Recognition

This is a mode in which image information stored in the buffer area of character/image file 5 is recognized, and normally carried out automatically after the finish of a file reception. FIG. 7 is a flow chart of the file recognition mode.

In a step C1, CPU 6 issues to control circuit 30 recognition section 2 a command of file recognition. As a result, row buffer 33 selects as its input data line 14 extending from switching buffer 23 of communication control section 1. A page format output for assigning an ID area which is arranged at a common position in each slip and in which a code for identifying the format of slip is written is issued in a step C2 to preprocessing circuit 34 through control circuit 30. In step C3, CPU 6 issues to control circuit 20 of communication control section 1 a command for file recognition, and thus control circuit 20 causes switching buffer 23 to select as its input data line 12 extending from CPU 6 and as its output data line 14. When control circuits 20 and 30 generate a READY signal in a step C4, the operation is shifted to a step C5. Character/image information in the buffer area is transferred, in step C5, to row buffer 33 via CPU 6, data line 12, switching buffer 23 and data line 14. When it is detected, in a step C6, that row buffer 33 is full of character/image information, the character recognition process is carried out in a step C7. The control circuit 30 issues a command to pre-processing circuit 34, which in turn detects and cuts out a predetermined character area (where an ID code representing the format of a slip is hand-written) according to the page format, and then supplies it to recognition circuit 35 after normalization. When recognition circuit 35 recognizes the character code (ID), the recognized character code is applied to CPU 6 through data line 13. In a step C9, CPU 6 checks whether the ID recognized by recognition section 2 is registered or not in the ID table in file 5. When the recognized ID is not registered in the ID table, said file is copied by recording section 3 in a step C10 as a usual manuscript having no character area.

When it is found in step C9 that the recognized ID is registered in the ID table, the character recognition process is carried out with respect to the character area of the file except the ID. Steps C11–C18 are fundamentally similar to steps C1–C8, but the page format corresponding to the recognized ID, that is, information for assigning the character area of a slip having the recognized ID has been issued to pre-processing circuit 34 in step C12. A character code is stored in the character code area of file 5 through CPU 6 in step C18. For example, slip number, article-name code, number of pieces, unit price and the like as well as the ID code are hand-written in the predetermined character area of an order slip and some of these characters cannot always be recognized by recognition circuit 35. Therefore, in step C19, characters rejected as unrecognizable are displayed on display 8 to be key-corrected. When the character recognition advances, as described above, to the last row of the predetermined character area in step C20, the recognition of the file of a page is finished. If it is detected, in a step C21, that some files are still left undisposed, a recognition process for these files starts from step C1.

File Copy

Figure 8:
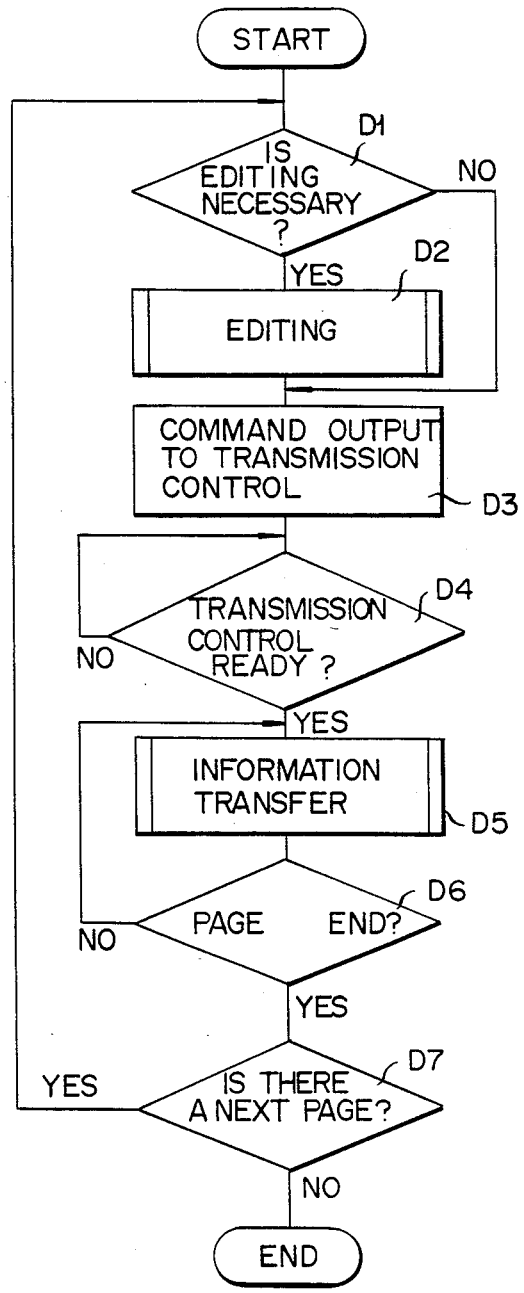

This is a mode in which a file in the buffer area of character/image file 5 is printed out, and an image editing is carried out if necessary. FIG. 8 shows a flow chart of the file copy.

In a step D1, in outputting a file, CPU 6 judges whether or not an editing process, such as order slips-to-list disposal, is needed. This judgement is carried out by a menu selection. When it is found in the file recognition mode that the ID code is not registered (including when the ID code cannot be recognized), said file is regarded as a usual manuscript and printed out as it is. When an editing process such as order slips-to-list disposal is specified by the menu selection, this editing process is carried out in a step D2. In step D2, CPU 6 picks up image information in a predetermined image area of said file, for example article name, orderer (address, telephone number, name), and destination (address with its map attached, telephone number, name) in the case of an order slip having a character area and an image area, and stores them in the image area of character/image file 5. Thereafter, CPU 6 issues a command to control circuit 20 in a step D3. The control circuit 20 drives recording section 3 and causes switching buffer 23 to select, as its input, data line 12 extending from CPU 6 and, as its output, data line 28. Upon receiving a READY signal from control circuit 20 in a step D4, CPU 6 starts to transfer image information in a step D5. When no editing process is carried out in this case, image information of said file is transferred as it is. When the editing is done, however, CPU 6 composes image information stored in the image area of character-/image file 5, character code stored in the character code area thereof, and background pattern of the output format, and causes recording section 3 to print them out. FIG. 10 shows the process of editing a plurality of order slips to a delivery list.

Menu Selection and Its Process

According to the system of the present invention, an operator can select, using keyboard 9, one of the process modes including usual facsimile transmission, facsimile reception, file registration, file output, file transmission and file reception. This is called menu selection. In the case of the file registration, a slip which has characters and images is inputted from the scanning section of OCR, and the character area is recognized while the image area has its necessary portions cut out, and they are stored in file 5 in an related relation 5. The file after editing is printed out in the file output mode. The contents of the file are transmitted through communication control section 1 in the file transmission mode. Character/image information is received from the communication control section 1 and stored in the file reception mode.

Figure 9:
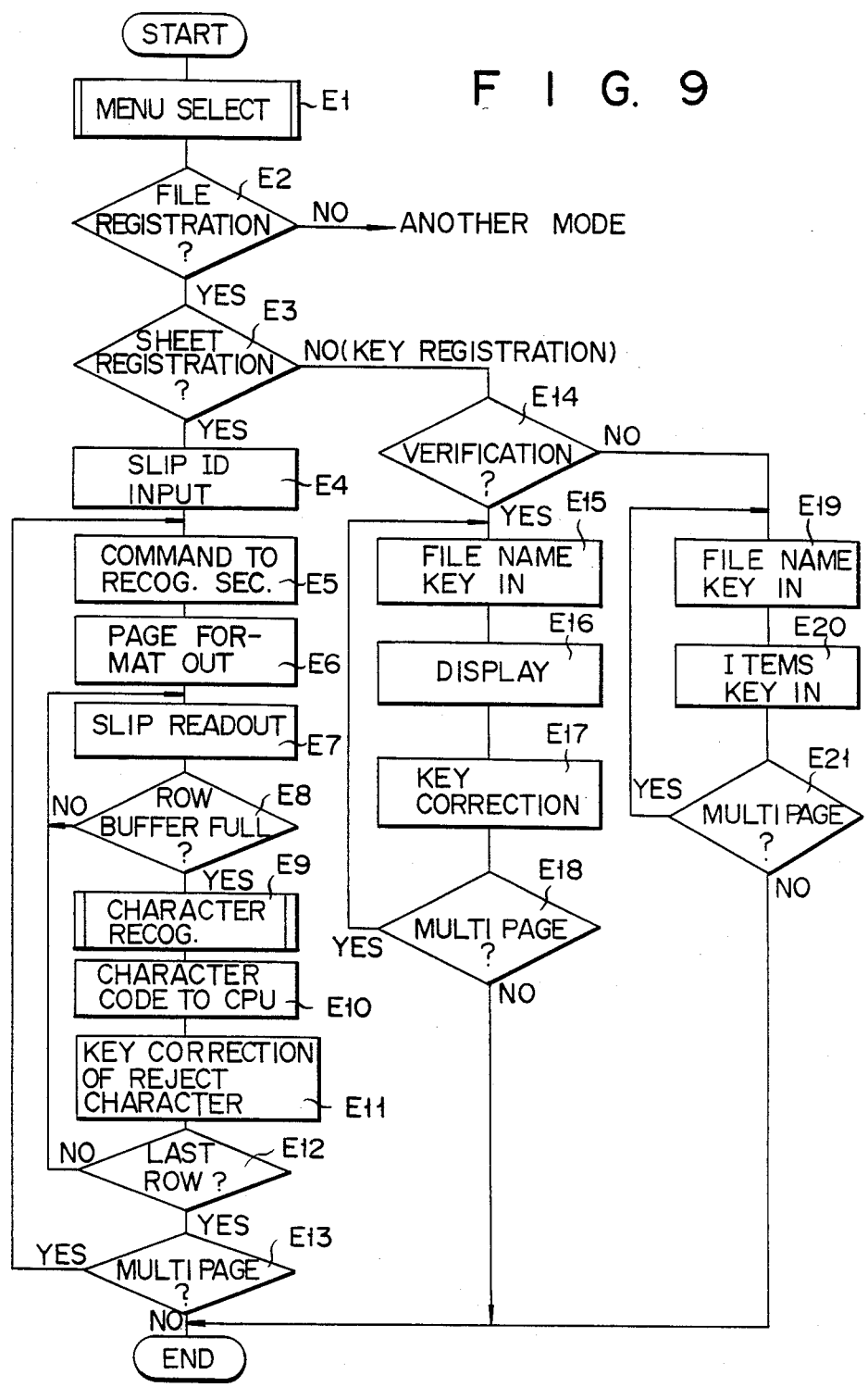

The typical file registration will be described referring to a flow chart shown in FIG. 9.

The operator makes menu selection according to the key input in a step E1. It is checked, in a step E2, whether or not a key input code specifies a file registration. When the file registration is selected, it is then checked which of sheet and key registrations is selected. The sheet registration means a file registration due to the operation of OCR, while the key registration means a file registration using the key input by the operator. In the case of the sheet registration, the operator inputs ID codes of the slip from the keyboard in a step E4. Recognition section 2 operates independently in steps E5–E13 and reads out the slip set in scanning section 4 similarly to the usual OCR operation. Character codes thus obtained are stored in the character code area of file 5 through CPU 6.

In the case of the key registration, registration items (or character codes) of the slips are inputted using the keyboard 9. It is a checked in a step E14 whether it is verification or new registration. When it is verification conducted in steps E15–E18, retrieval and correction of the file already recognized can be carried out. Namely, file name or ID code and slip number in this case are inputted using the keyboard 9 in the step E15. The contents of the file assigned are displayed on the display in step E16 and key correction is effected in step E17 if there is something to be corrected.

In new registration, a new file can be prepared using the keyboard in steps E19–E21. The ID code is keyed in step E19 and items such as slip numbers to be registered are successively inputted in step E20, using the keyboard.

What we claim is:

1. A system having an optical character reader function, a facsimile function, and an image editing function, comprising:
scanning means for optically scanning documents to produce electrical signals indicative of character-image information on the documents, said documents including a document of a first predetermined format having a character area in which character groups each having a predetermined attribute are disposed in predetermined first locations of the document, and an image area in which images each having a predetermined attribute are disposed in predetermined second locations of the document, the document of said first format having a detecting character group in a predetermined location of the character area which is adapted to detect whether or not the document is of the first format;
communication control means for effecting communication of the character-image information on the documents including the document of the first format with external devices through facsimile communication lines;
character recognition means connected to receive the character information from said scanning means and said communication control means for recognizing characters on the character area of the document of the first format to produce character code information;
character-image file means for storing character information, obtained from said scanning means and said communication control means, of the characters in the character area and the image information in the image area of the document of the first format, in predetermined locations thereof, said character-image file means comprising a buffer region adapted for temporarily storing the character-image information from said scanning means and said communication control means, an image region adapted for storing the image information on the image area of the document of the first format, and a character code region adapted for storing the character code information on the character area of the document of the first format from said character recognition means;
processing mode designating means for designating processing modes to be performed, said processing modes including an editing mode in which the character-image information of the first format stored in said character image file means is rearranged according to a second format different from the first format, and a printing mode in which the edited character-image information is printed out;
processor means responsive to the designation of a processing mode by said processing mode designating means for implementing the designated processing mode, said processor means including, when the editing mode is designated, means for receiving the character-image information from said character-image file means, means for causing said recognizing means to recognize said detecting character group of the character area to detect whether or not the document is of the first format, and, when the document is of the first format, to recognize the character groups on the remaining portion of the character area of the document; means for transferring the image information to said image region of said character-image file means and the character code information to said character code region of said character-image file means after said recognizing means has recognized the character information in the character area of the document when the document is of the first format;
means for receiving the character code information corresponding to recognized characters and the image information on the document of the first format stored in said character-image file means, and for arranging the character code information and the image information of the document of the first format according to the second format; and printing means responsive to the designation of the printing mode by said processing mode designating means and an instruction thereto from said processor means for printing the edited character image information from said processor means on a sheet of the second format.

* * * * *